US007216606B1

(12) United States Patent
Treloar et al.

(10) Patent No.: US 7,216,606 B1

(45) Date of Patent: May 15, 2007

(54) METHOD AND SYSTEM FOR REDUCING UNDESIRABLE EMISSIONS FROM FACILITIES FOR HOUSING SWINE

(76) Inventors: Roger H. Treloar, 2385 Sugar Bottom Rd. NE., Solon, IA (US) 52333; Robert R. Treloar, 16423 E. Bainbridge Ave., Fountain Hills, AZ (US) 85268-2721

( * ) Notice: Subject to any disclaimer, the term of this patent is extended or adjusted under 35 U.S.C. 154(b) by 191 days.

(21) Appl. No.: 10/709,457

(22) Filed: May 6, 2004

Related U.S. Application Data

(60) Provisional application No. 60/529,233, filed on Dec. 15, 2003.

(51) Int. Cl.
*F24F 7/00* (2006.01)
*A01K 1/00* (2006.01)

(52) U.S. Cl. ...................................... 119/447; 119/448

(58) Field of Classification Search ................ 119/447, 119/448, 450, 527; 210/295, 314, 348, 353, 210/395

See application file for complete search history.

(56) References Cited

U.S. PATENT DOCUMENTS 4,292,927 A * 10/1981 Sassmann ................... 119/448
5,666,905 A * 9/1997 Mackin et al. .............. 119/448
6,321,687 B1 * 11/2001 Lemmon et al. ............ 119/448

OTHER PUBLICATIONS

"Fresh From The Farm" by David Taylor, Environmental Health Perspective, vol. 107 No. 3, Mar. 1999, p. A154-157.*

"Keeping The Big Picture In Mind" by Charles Blake Johnson, National Hog Farmer, pNA, Sep. 1999.*

"Biofliter Media Mixture Ratio Of Wood Chips And Comopst Treating Swine Odors" by R. E. Nicolai and K. A. Janni; Dept. of Biosystems and Agricultural Engineering, Univ. of Minnesota in St. Paul, Water Science and Technology vol. 44 (9), p. 261-267.*

Schmidt, Janni, Nicolai, "Biofilters for Odor Control", University of Minnesota Extension Service, 2000.

Schmidt, Janni, Nicolai, "Biosystems and Agricultural Engineering Update", University of Minnesota Extension Service, Mar. 2004, BAEU-18.

See the "Background of Invention" section on pp. 1-3 in the specification of this patent application.

R-1: C-FAR Swine Odor and Manure Mangement Development and Evaluation of Dedusters for Dust and Odor Reduction; Principal Investigator: Yuanhui Zhang.

R-2: Livestock Odor Research in Illinois.

R-3: Illinois Odor and Nutrient Control Proving Center.

R-4: Summary—Best Technologies for Reducing Odor Emissions from Curtain-Sided, Deep Pit Swine Finishing Buildings.

R-5: Measurement of Odour Emissions from Hog Operations in Manitoba.

R-6: Odour Production, Evaluation and Control.

R-7: Bio-filter effectiveness on Ten-Stall Farrowing Building Pit Exhaust a Demonstration Project.

* cited by examiner

*Primary Examiner*—Robert P. Swiatek
*Assistant Examiner*—Elizabeth Shaw
(74) *Attorney, Agent, or Firm*—Simmons Perrine Albright

(57) ABSTRACT

A system and method of reducing odors of livestock confinement operations which utilizes a V-shaped filter of wood chips disposed in front of exhaust fans from manure pits under a livestock confinement building and a method of cleaning the wood chips involving spraying them with a solution.

4 Claims, 5 Drawing Sheets

114
304
104
302

104 – Ventilation exhaust ports
114 – Side filter system
302 – Exhaust fan outlet end
304 – Alternate exhaust air escape opening 100 – Structure housing animals
102 – Exterior wall of structure
104 – Ventilation exhaust ports from structure
110 – Filter system
112 – Filter system top section
114 – Filter system side section
116 – Filter system side section frame 112 – Top filter system
114 – Side filter system
116 – Filter system side section frame
119 – Space for filter medium
402 – Support bar for top filter system
403 – Porous mesh surrounding top and side filter system to contain filter medium 104 – Ventilation exhaust ports
114 – Side filter system
302 – Exhaust fan outlet end
304 – Alternate exhaust air escape opening 104 – Ventilation exhaust port
112 – Top filter system
110 – Filter system
402 – Support bar for top filter system 112 – Top filter sections
116 – Side filter sections
402 – Support bar for top filter sections

METHOD AND SYSTEM FOR REDUCING UNDESIRABLE EMISSIONS FROM FACILITIES FOR HOUSING SWINE

CROSS REFERENCE TO RELATED APPLICATIONS

This application claims the benefit of U.S. Provisional Application No. 60/529,233 filed on Dec. 15, 2003 by Roger H. Treloar of Solon, Iowa and Robert R. Treloar of Fountain Hills, Ariz., entitled PORC P7 (pork odor reducing control).

BACKGROUND OF INVENTION

Over the past 10 years, water and air quality issues relating to the swine industry have been a public concern in the United States. Fairly or not, strong opposition by the general public and many environmental groups to new swine facility construction or renovation has prompted the United States Environmental Protection Agency (EPA) to enact, through state agencies such as the Department of Natural Resources (DNR), stringent, and increasingly limiting, construction, disposal, and emission standards. These new guidelines have merit in what they are trying to achieve—cleaner air and water, with better construction practices to ensure a minimal risk of contamination to the environment. However, the overall effect of these new regulations has been to cause some states to put a moratorium on any new swine facility construction, and further has caused many growers to rethink their expansion plans. Industry leaders estimate the value of pork production in Iowa alone is $12 billion. Significant declines in pork production would represent a considerable loss to the economy in terms of activities involved directly or indirectly with pork production. The new DNR regulations may guide the direction of the future of the swine industry, but they do not address existing sites where urban sprawl and real estate concerns for property owners near facilities have caused disharmony between producers and urban residents.

Currently, there are many technologies dealing with odor control. Some deal with application methods, such as manure injection below ground. A few address the issue of open pits versus covered pits. Others deal with composting of mortalities and the installation of windbreaks.

While these prior art technologies have enjoyed some success and have been used or at least experimented with in the past, they do have some drawbacks.

First of all, the direct injection of manure below ground is an efficient way to control runoff and potential water contamination but falls short in the odor this process creates during the 24- to 48-hour soil saturation period during application.

Secondly, composting is a good way to deal with disposal of mortalities, but it is a small percentage of the odor produced by a swine facility.

Thirdly, windbreaks of growing trees are either very expensive or have very long lead times until they become optimal in their performance and may alter the airflow dynamics of the site. As a result, effective and efficient ventilation may be compromised.

Fourthly, pit additives are costly and vary greatly in their performance. Some additives may alter the water chemistry and change the composition of the manure. Changing this composition would affect the elements of the manure management plan.

Experimentation with the natural bio-filtering may cause clogging and sealing of the filtering medium. The apparatus demands a great deal of site preparation and ground work and is labor intensive during maintenance and replacement of the filtering medium.

Adaptation of industrial scrubbers to address the odor issue requires the addition of input energy and water into the system. The addition of water may dilute the manure in the pit if returned to the pit. This would change the composition of the manure and affect the fertilizer value of the manure. Efforts to recycle the water from the scrubber are currently complex and costly.

Consequently, there exists a need for improved methods and systems for reducing the undesirable effluent from swine production facilities.

SUMMARY OF INVENTION

It is an object of the present invention to provide a system and method for reducing odorous emissions from swine production facilities in an efficient manner.

It is a feature of the present invention to utilize a filtering system disposed at exhaust fans in swine production facilities.

It is an advantage of the present invention to remove much of the undesirable odorous emissions before they are permitted to become dispersed.

It is another advantage of the present invention to reduce noise output from swine production facilities which employ exhaust fans.

It is yet another advantage of the present invention to reduce the level of animal dander exhausted from the facilities; it is believed that this may reduce the distance that odor can travel from the facility.

It is another feature of the present invention to provide for alternate exhaust escape routes in the event that the filter may be clogged.

It is another advantage of the present invention to not expose the swine to danger as a result of improper operation of the odor emission control system.

It is another feature of the present invention to utilize inexpensive components for the filter.

It is yet another advantage of the present invention to provide a relatively low cost approach to achieving significant reductions in odorous emissions.

It is yet another feature of the invention to utilize a filter system which has no moving parts and utilizes no electricity.

It is another advantage of the invention to provide a highly reliable odorous emission control system.

It is another advantage of the present invention to utilize a filtering medium that may be reused and recycled in an environmentally friendly way.

The present invention is an apparatus and method for reducing undesirable emissions from swine production facilities, which has been designed to satisfy the aforementioned needs, provide the previously stated objects, include the above-listed features, and achieve the already articulated advantages. The present invention is carried out in a "wasted resource-less" manner in a sense that the cost of the present invention is low, the time consumed in repairing, maintaining and/or replacing the present invention is low, and the energy consumption used by the present invention is low.

Accordingly, the present invention is a system and method comprising a partial filter being placed in front of an exhaust fan on a swine production facility.

BRIEF DESCRIPTION OF DRAWINGS

The invention may be more fully understood by reading the following description of the preferred embodiments of the invention, in conjunction with the appended drawings wherein.

DETAILED DESCRIPTION

Figure 1:
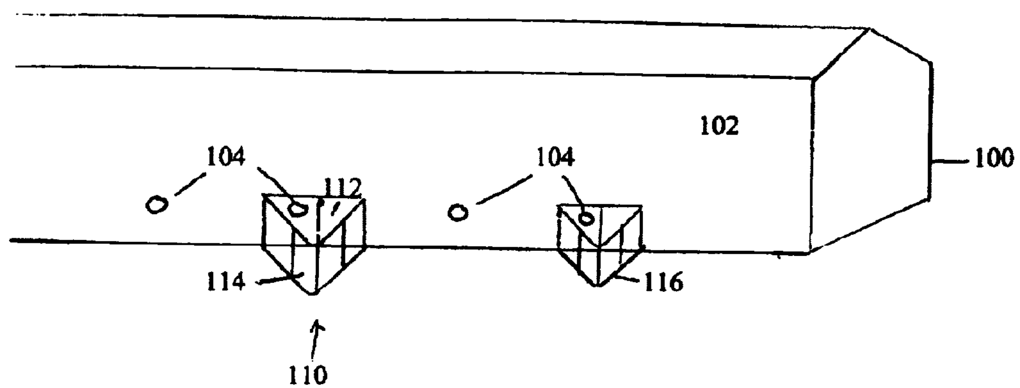
FIG. 1 is a perspective view of a side of a swine production facility with several filters of the present invention.

Now referring to the drawings wherein like numerals refer to like matter throughout, and more specifically referring to FIG. 1, there is shown a swine production facility of the present invention generally designated 100, including a confinement building having an exterior wall 102 and numerous exhaust ports 104. The facility 100 may be a typical confinement building with a concrete waste pit disposed underneath it for collecting and treating animal waste (primarily feces, urine and undigested animal feed). The exhaust ports 104 are typically exhaust fans blowing the vapors associated with the waste pit out of the pit so as to maintain livable conditions within the building. The exhaust port 104 may have a large fan, which could have an output of between 1500 cubic feet per minute (CFM) and 4000 CFM.

The filter system 110 is shown having a filter system top section 112, which is preferably in two pieces, but tops having a single or more than two pieces may be preferred in certain applications. Filter system top section 112 has a filter system top section edge flow restricting barrier 113, which may be a board, plastic or other panel which tends to force the air exiting through the filter system top section 112 to flow upward through the media therein and not diagonally through the edges. Filter system 110 is shown in a triangular shape and has two filter system side sections 114 (only one side is shown in FIG. 1). Filter system side section 114 includes a filter system side section frame 116, which is preferably made of polyvinylchloride (PVC) pipe or other material with properties suitable to exposure to the outdoor elements and to the emissions which exhaust from the pit. Filter system top section or panel 112 and filter system side section or panel 114 also comprise a hardware cloth, wire mesh, non-metallic mesh or chicken wire. Preferably this mesh is coated with a plastic material, such as PVC or a suitable substitute to reduce corrosion.

In an exemplary embodiment of the present invention, the filter system side section 114 is approximately 30 in. high and 54 in. long with a thickness of 5 in. The top filter panels 112 consist of two identical right triangles with 38-inch sides and 4-inch thickness constructed in the same manner. Top filters rest on a top section support structure 402 (FIG. 4), which is preferably 15×15×30 inches. Filter system top section edge flow restricting barrier 113 may be treated wood panels attached to the top filter panels to also contain the filtering medium, while a front panel 122 is fastened to contain the filtering medium at the seam or "V" of the side panels 114. The filter system base edge 118 is a 3-inch diameter base frame of PVC which surrounds the filter system 110 to allow for a collection area when the filter medium 119 is being changed. By using PVC and PVC-coated hardware cloth, the optimum standards may be achieved while maintaining cost effectiveness and durability. By using the absorption capabilities of wood mulch/chips as the filtering medium 119, a reusable, environmentally friendly product of the filtration process is created which is easily disposed or recycled. The wood chips are medium sized with an average size being 1" to 2", and it is believed that western bark may be preferred, but it should be understood that quality and consistency of the wood or bark may vary efficiency.

It should be understood that the foregoing description is preferred when the exhaust port 104 has a flow rate of between 1500 CFM and 4000 CFM and an exit opening of between 18" and 24". In general, the higher the flow rate, the larger the required surface area of the internal sides of the filter system 110.

Figure 2:
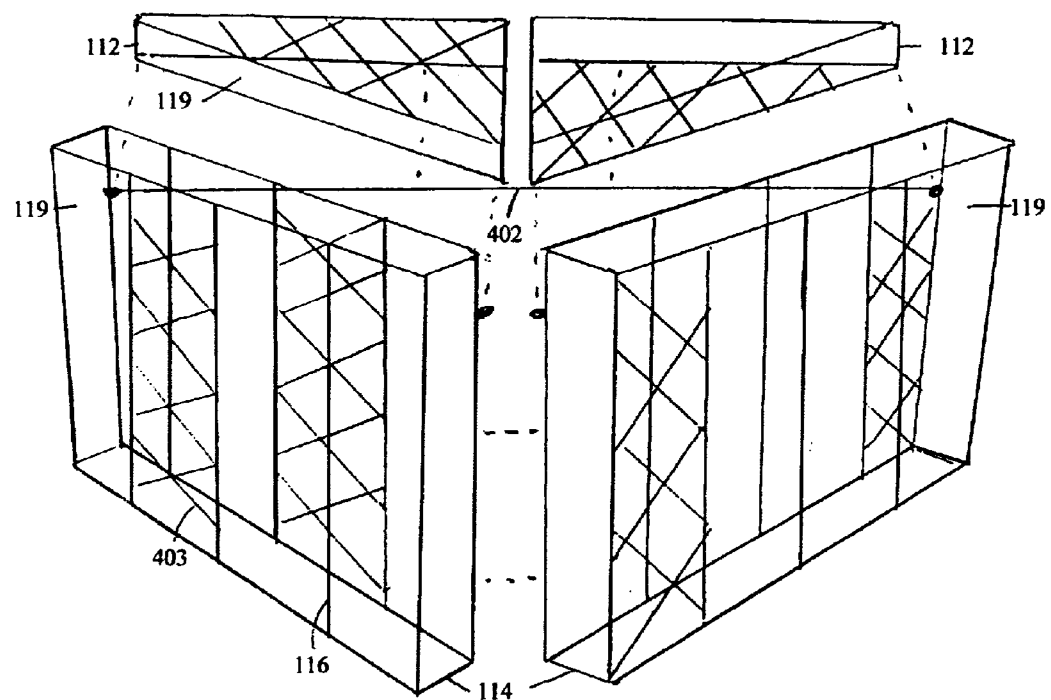
FIG. 2 is a perspective view of one of the filters of FIG. 1.

Now referring to FIG. 2, there is shown a larger view of the filter system 110 of FIG. 1, with a better view of filter system top section 112 and both filter system side sections 114. It should be understood that a V-shaped configuration with a top section is preferred; however, other shapes and configurations which cause a large portion of the exhaust air from exhaust port 104 to pass through the medium 119, could be used as well.

Figure 3:
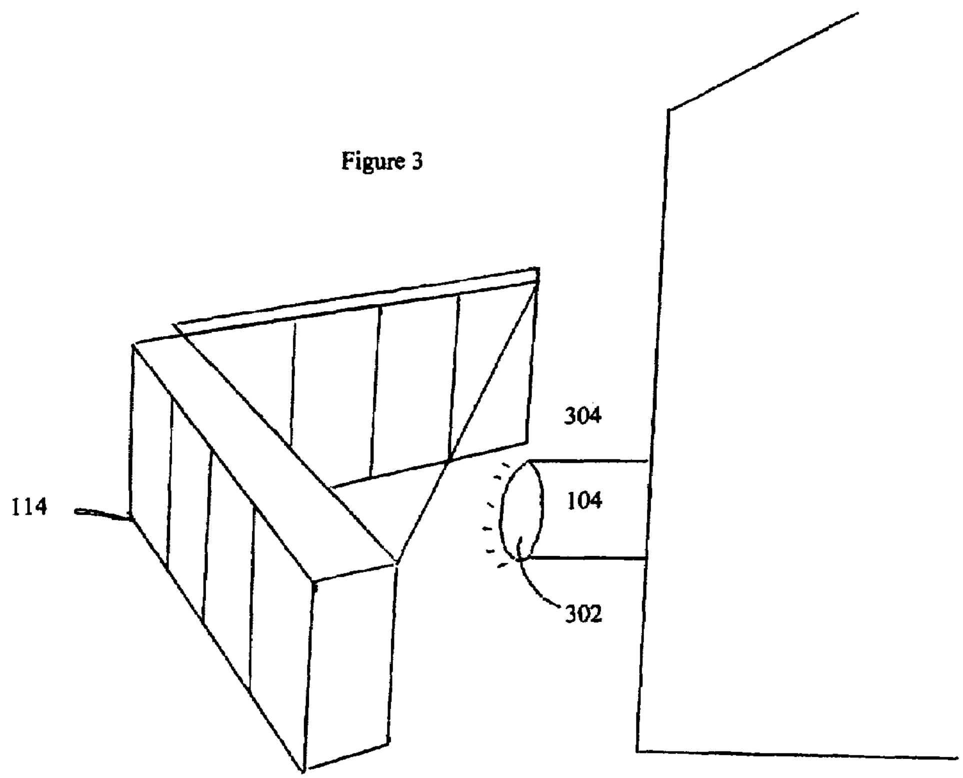
FIG. 3 is a partially dismantled upper perspective view of the filter of FIG. 2 with a top portion having been removed to expose a backside of the filter.

Now referring to FIG. 3, there is shown a partially dismantled view of the filter system 110 of FIGS. 1 and 2. The filter system top section 112 has been removed to expose to view the inside of filter system 110. Exhaust fan outlet end 302 is shown, as well as alternate exhaust air escape opening 304. Alternate exhaust air escape opening 304 is an important gap or opening. Without an alternate exhaust air escape opening 304, or with an inadequately sized alternate exhaust air escape opening 304, a deadly backup of the system could occur if the filter system 110 were to become clogged or have a dramatically reduced ability to pass exhaust through. The area of alternate exhaust air escape opening 304 would need to be larger as the flow rate of the exhaust port 104 increases. For example, swine facilities with larger and fewer exhaust fans would require large filter systems 110 with larger alternate exhaust air escape openings 304 than would facilities with more fans each outputting a lower volume of air per minute. With an exhaust fan operating at 3000 CFM, it is believed that the separation of filter system side section 114 from exterior wall 102 would be about 18 inches.

Also, medium (bark) is shown disposed at the apex of the V between the panel 122 and the front edges of filter system side sections 114.

Figure 4:
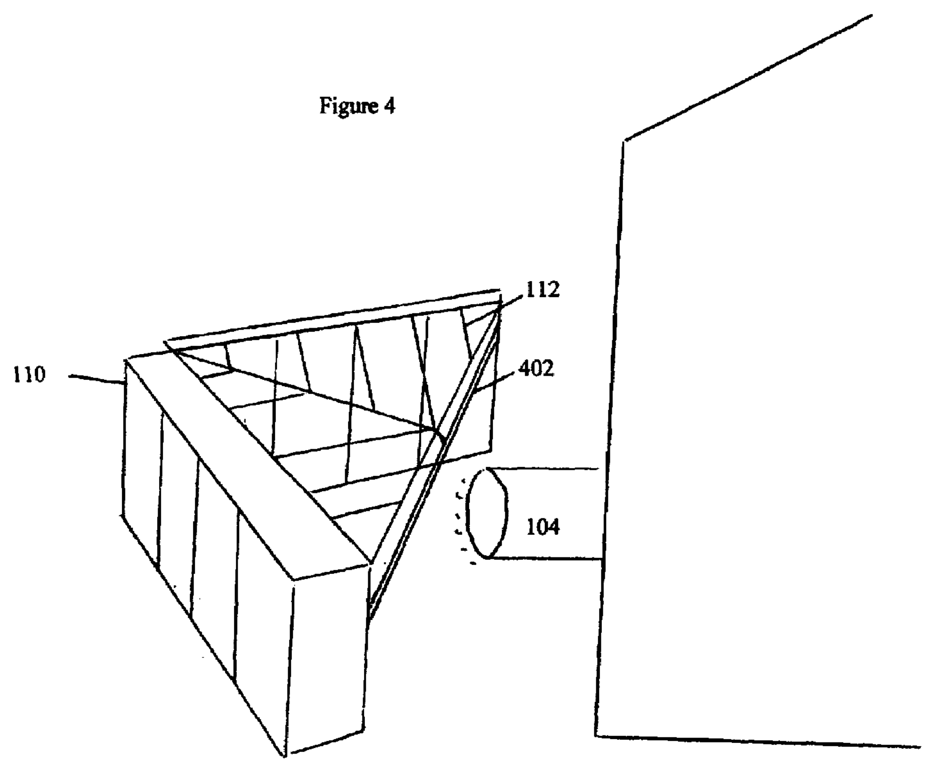
FIG. 4 is an upper perspective view of the filter of FIG. 3 with the top portion in place.

Now referring to FIG. 4, there is shown a filter system 110 of FIG. 3, with the filter system top sections 112 disposed on a top section support structure 402.

Figure 5:
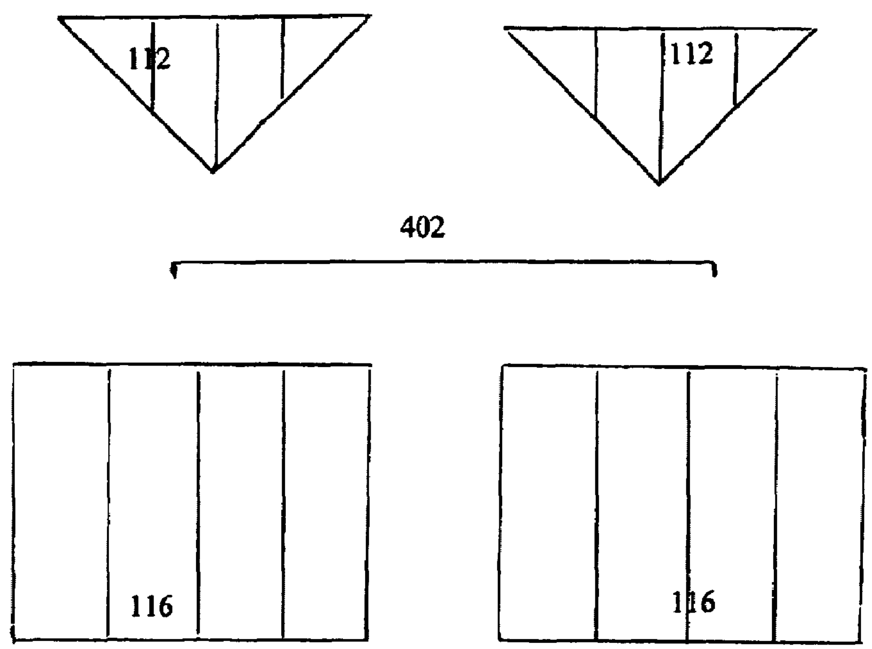
FIG. 5 is a view of the material retaining structures of the present invention in an unassembled state.

Now referring to FIG. 5, there is shown the components of the filter system 110, in an unassembled state, without the medium.

Throughout this description, reference is made to swine production, because it is believed that the beneficial aspects of the present invention would be most readily apparent when used in connection with swine; however, it should be understood that the present invention is not intended to be limited to swine, and should be hereby construed to include other stock confinement and manure treatment applications as well. For example only, and not intended as a limitation, the filter system 110 could be used with turkey, chicken, or cattle confinement operations. Also, the filter system 110 could be used with any type of manure or animal waste storage or treatment facility irrespective if it is located under an animal confinement building.

In operation, the filter system 110 of the present invention could be operated as follows:

1.Filter system 110 is deployed in front of an exhaust port 104 of a containment structure for manure and/or animal waste.

2.Air from inside the containment structure exits through the exhaust port 104 and encounters the filter system 110.

3.A solution such as ASBA 5 and BP5 is applied to the medium in the filter system 110, which tends to enhance the performance of the medium in filtering out undesired emissions.

The solution may be variable, depending upon the particular type of emission which is targeted for removal. For example, if ammonia is the primary targeted emission for filtering, then a preferred solution may be:

The ASBA5 available from PORC Systems, LLC of Solon, Iowa, which is made up of water, sulfuric acid not greater than 5%, dilute acetic acid not greater than 5%, pine oil not greater than 1.5%, emulsifier not greater than 1.5%.

If Hydrosulfide is the primary target, then a preferred solution may be:

The BP5, also available from PORC Systems, LLC of Solon, Iowa, is made up of water, sodium bicarbonate not greater than 5%, pine oil not greater than 1.5%, emulsifier not greater than 1.5%. The emulsifier may be common house-hold dishwashing liquid.

The solution may be applied with a hand sprayer to the exterior and interior surface of the filter system 110. It is believed that a 1 to 2-week interval may be sufficient; of course, in some situations, more frequent applications may be desirable.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

The invention claimed is:

1. A process of housing animals and reducing odors exiting from a pit containing animal feces, the process comprising the steps of;

providing a building configured to house a plurality of animals;

providing a pit beneath said building configured to retain feces from said animals;

providing a fan to remove air from said pit;

placing a filter of loose organic material in front of a stream of air being blown by said fan;

blowing air through said filter and causing matter to collect on said loose organic material, thereby reducing an ability of said filter to permit airflow through said filter; causing said filter to have an increased ability to permit airflow through said filter while simultaneously increasing a capability of said filter to remove said matter from said stream of air;

said step of causing said filter to have an increased ability to permit airflow comprises the steps of spraying a solution onto said loose organic material to cleanse said loose organic material;

and said step of spraying a solution comprises a step of placing a spray nozzle behind said filter and spraying said solution in a direction of a stream of air when said stream of air is being blown from said fan to exhaust vapors from said pit.

2. A process of claim 1 wherein said step of causing said filter to have an increased ability to permit airflow comprises the steps of removing said loose organic material, and thereby creating a void in said filter, and pouring loose organic material into said void.

3. A process of claim 1 wherein said loose organic material comprises wood chips.

4. A process of raising livestock and reducing odors resulting from confinement of such livestock comprising the steps of:

providing a building configured to house livestock;

said building being further configured to allow feces from said livestock to collect in a pit disposed beneath said building;

providing a plurality of exhaust fans, configured to exhaust air from said pit, thereby removing noxious vapors from said pit;

providing a plurality of filters, where each of said plurality of filters is disposed in a stream of air generated by one of said plurality of exhaust fans;

wherein each of said plurality of filters comprises:

a concave-shaped frame of pipes and mesh; and a top section disposed over a space defined by said concave-shaped frame;

pouring wood chips into a space defined by said coated hardware cloth and supported by said polyvinylchloride pipes;

feeding said livestock while housed in said building, thereby causing feces to collect in said pit;

removing noxious fumes from said pit by blowing air through said plurality of filters; and spraying, from a hand-held sprayer located at an internal side of said concave-shaped frame, a solution comprising: water, sulfuric acid, acetic acid, and pine oil.

* * * * *